United States Patent
Agashe et al.

(10) Patent No.: US 9,491,671 B2
(45) Date of Patent: Nov. 8, 2016

(54) RADIO LINK FAILURE REPORTING

(75) Inventors: Parag A. Agashe, San Diego, CA (US); Nathan E. Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 511 days.

(21) Appl. No.: 12/618,154

(22) Filed: Nov. 13, 2009

(65) Prior Publication Data
US 2010/0124173 A1 May 20, 2010

Related U.S. Application Data

(60) Provisional application No. 61/115,522, filed on Nov. 17, 2008.

(51) Int. Cl.
*H04W 36/00* (2009.01)
*H04W 76/02* (2009.01)

(52) U.S. Cl.
CPC ....... *H04W 36/0083* (2013.01); *H04W 76/027* (2013.01)

(58) Field of Classification Search
CPC .................... H04W 36/0083; H04W 36/0088; H04W 36/0094; H04W 76/00; H04W 76/02; H04W 76/021; H04W 76/022; H04W 76/023; H04W 76/024; H04W 76/025; H04W 76/026; H04W 76/027; H04W 76/028; H04W 24/10; H04W 36/24; H04W 36/245; H04W 36/26; H04W 36/28; H04W 36/30; H04W 36/32; H04W 36/34; H04W 36/36; H04W 36/367; H04W 36/38; H04W 36/385
USPC ....................................................... 370/245
See application file for complete search history.

(56) References Cited

U.S. PATENT DOCUMENTS 5,884,163 A 3/1999 Hardouin
7,876,729 B1 1/2011 Grilli et al.
(Continued)

FOREIGN PATENT DOCUMENTS

CN 1717880 A 1/2006
CN 101273659 A 9/2008
(Continued)

OTHER PUBLICATIONS

3GPP TSG-RAN WG2 (Jun. 25-29, 2007).*
(Continued)

*Primary Examiner* — Stephen J Clawson
(74) *Attorney, Agent, or Firm* — Steven A. Raney

(57) ABSTRACT

A communication node determines that radio link failure occurred during connected state mobility of an access terminal and reports the radio link failure to another communication node. For example, a target access point may determine that radio link failure occurred during handover of an access terminal and send a radio link failure report message to the access point that was previously serving the access terminal or to some other node (e.g., a network node). In the first case, the serving access point may adjust mobility parameters based on this radio link failure information and, optionally, other reported radio link failure information. In the second case, the other node may send a radio link failure report message to the serving access point, or the other node may adjust mobility parameters based on this radio link failure information (and, optionally, other reported radio link failure information) and send the adjusted mobility parameters to the serving access point.

45 Claims, 8 Drawing Sheets

(56) References Cited

U.S. PATENT DOCUMENTS

| | | |
|---|---|---|
| 2004/0092262 A1 | 5/2004 | Voyer et al. |
| 2004/0203717 A1* | 10/2004 | Wingrowicz et al. ........ 455/423 |
| 2004/0229626 A1* | 11/2004 | Yi et al. ......................... 455/450 |
| 2007/0286155 A1 | 12/2007 | Kaikkonen et al. |
| 2007/0293224 A1 | 12/2007 | Wang et al. |
| 2008/0008212 A1 | 1/2008 | Wang et al. |
| 2008/0161600 A1 | 7/2008 | Ritter |
| 2008/0233963 A1 | 9/2008 | Alanara et al. |
| 2008/0242292 A1 | 10/2008 | Koskela et al. |
| 2008/0261600 A1* | 10/2008 | Somasundaram et al. ... 455/436 |
| 2008/0268833 A1 | 10/2008 | Huang et al. |
| 2009/0061878 A1* | 3/2009 | Fischer ........................ 455/436 |
| 2009/0163208 A1 | 6/2009 | Rao |
| 2009/0176490 A1 | 7/2009 | Kazmi et al. |
| 2010/0124918 A1 | 5/2010 | Agashe et al. |
| 2010/0267378 A1 | 10/2010 | Hamabe et al. |
| 2011/0026492 A1 | 2/2011 | Frenger et al. |
| 2011/0028144 A1 | 2/2011 | Catovic et al. |

FOREIGN PATENT DOCUMENTS

| | | |
|---|---|---|
| EP | 1284579 | 2/2003 |
| JP | 2002271833 A | 9/2002 |
| JP | 2008503172 A | 1/2008 |
| JP | 2011530912 A | 12/2011 |
| JP | 5234004 B2 | 7/2013 |
| RU | 2233546 | 7/2004 |
| RU | 2321970 C2 | 4/2008 |
| WO | 0021314 A2 | 4/2000 |
| WO | WO-0167788 A2 | 9/2001 |
| WO | 2005025091 A1 | 3/2005 |
| WO | WO2008016885 | 2/2008 |
| WO | WO2008086460 | 7/2008 |
| WO | WO2008114183 | 9/2008 |
| WO | 2008131401 A1 | 10/2008 |
| WO | 2009060935 A1 | 5/2009 |
| WO | WO2010002926 | 1/2010 |
| WO | WO-2010017961 A1 | 2/2010 |

OTHER PUBLICATIONS

Huawei: "RLF Analysis," 3GPP Draft; R2-081697; Shenzhen, China, (Mar. 31, 2008).
Huawei: "Solutions for the Mobility Robustness use case" 3GPP Draft; R3-081165, Kansas City, USA; (May 5, 2008), XP050164358, p. 2, paragraph 2 and paragraph 3.1 to p. 5, paragraph 6.
International Search Report & Written Opinion—PCT/US2009/064642, International Search Authority—European Patent Office—Mar. 26, 2010.
Nortel: "Multi-eNB Handover preparation for Radio Link Failure Recovery," 3GPP Draft; R3-071595; Athens, Greece; (Aug. 20, 2007), XP050162408.
NTT DOCOMO: "RRC Re-establishment Procedure," R2-061928; 3rd Generation Partnership Project (3GPP) TSG-RAN WG2 Ad-hoc on LTE; XP-002488901, (Jun. 27, 2006), pp. 1-6.
Partial International Search Report—PCT/US2009/064639—International Search Authority—European Patent Office, May 3, 2010.
Qualcomm Europe: "RLF-Based Neighbour List Optimization," 3GPP Draft; R2-080346, 3rd Generation Partnership Project, Sevilla, Spain, (Jan. 18, 2008).
Huawei et al., "Mobility Load Balancing Optimization Use Case", 3GPP TSG RAN WG3 Meeting #59, (R3-080360), Sorrento, Italy, Feb. 5, 2008, found in the Internet at http://www.3gpp.org/ftp/tsg_ran/WG3_lu/TSGR3_59/docs/.
Taiwan Search Report—TW098139044—TIPO—Jan. 4, 2013.
Huawei, "RLF Analysis", 3GPP TSG RAN WG2 Meeting #61bis, R2-0816973, Mar. 2008.
Qualcomm Europe, "RLF-based neighbour list optimization", R3-080068, 3GPP TSG-RAN WG3 #59, Feb. 11-15, 2008, Sorrento, Italy, Retrieved from the Internet: <http://www.3gpp.org/ftp/tsg_ran/WG3_lu/TSGR3_59/docs/R3-080068.zip>, pp. 1-5.

* cited by examiner

RADIO LINK FAILURE REPORTING

CLAIM OF PRIORITY

This application claims the benefit of and priority to commonly owned U.S. Provisional Patent Application No. 61/115,522, filed Nov. 17, 2008, and assigned the disclosure of which is hereby incorporated by reference herein.

CROSS-REFERENCE TO RELATED APPLICATION

This application is related to concurrently filed and commonly owned U.S. patent application Ser. No. 12/618,240, entitled "MOBILITY MANAGEMENT BASED ON RADIO LINK FAILURE REPORTING," and assigned, the disclosure of which is hereby incorporated by reference herein.

BACKGROUND

1. Field

This application relates generally to wireless communication and more specifically, but not exclusively, to improving wireless mobility.

2. Introduction

A wireless communication network is deployed over a defined geographical area to provide various types of services (e.g., voice, data, multimedia services, etc.) to users within that geographical area. In a typical implementation, access points (e.g., corresponding to different cells or sectors) are distributed throughout a network to provide wireless connectivity for access terminals (e.g., cell phones) that are operating within the geographical area served by the network. In general, at a given point in time, the access terminal will be served by a given one of these access points. As the access terminal roams throughout this geographical area, the access terminal may move away from its serving access point and move closer to another access point. In this case, the access terminal may be handed-over from its serving access point to be served by the other access point to maintain mobility for the access terminal.

An example of how an access terminal may be handed-over follows. The access terminal may regularly perform radio frequency ("RF") measurements and determine that the signals being received from a neighbor access point (e.g., a so-called target access point) are stronger than the signals being received from the current serving access point by a certain margin. As a result, the access terminal sends a measurement report with this information to the network (e.g., to the serving access point). The serving access point (i.e., the source access point for the handover) then performs backhaul communication with the target access point to negotiate resources for the access terminal on the target access point. Here, the serving access point may send context information for the access terminal to the target access point. In addition, the serving access point sends a handover command to the access terminal, wherein the handover command identifies the resources assigned to the access terminal on the target access point. The access terminal may then connect to the target access point using these resources.

Under certain circumstances, radio conditions between an access terminal and its serving access point may deteriorate to the point where the access terminal experiences radio link failure with the serving access point. In such a case, after the access terminal declares radio link failure, the access terminal may attempt to access a target access point. During this access the access terminal provides its own identification and the identity of the prior serving access point to the target access point. In the event the target access point was prepared for the handover by the serving access point (e.g., as discussed above), the target access point may be able to serve the access terminal since the target access terminal may have context information and other data for the access terminal On the other hand, if the target access point had not been prepared, the target access point may reject the access terminal whereupon the access terminal may go to idle mode. Alternatively, the target access point may perform a forward handover procedure, whereby the target access point fetches the context information for the access terminal from the prior serving access point.

SUMMARY

A summary of sample aspects of the disclosure follows. In the discussion herein, any reference to the term aspects may refer to one or more aspects of the disclosure.

The disclosure relates in some aspects to reporting radio link failure (hereafter, RLF). For example, it may be beneficial for a source access point (e.g., a source cell) to keep track of RLF events so that the source access point may adjust its behavior (e.g., by adjusting mobility parameters) to improve mobility performance. However, under certain circumstances, the serving access point may not be able to determine on its own that RLF occurred.

The disclosure relates in some aspects to a node that determines whether RLF occurred during connected state mobility of an access terminal and, if so, reports the RLF to another node. For example, a target access point (e.g., a target cell) may determine that RLF occurred during handover of an access terminal to that target access point.

In some implementations, the target access point may send an RLF report message to the access point that was previously serving the access terminal (i.e., the source access point for the handover). Upon receiving this message, the serving access point may use the RLF information included in the message and, optionally, other RLF information that has been reported to the serving access point to keep track of handover performance, detect handovers that failed due to the absence of measurement reports from served access terminals, and adapt mobility parameters. For example, the serving access point may adjust measurement reporting parameters and handover parameters based on this RLF information (e.g., information regarding a particular RLF event or several RLF events where the target was unprepared). Thus, RLF reporting may be advantageously employed to improve mobility performance in a network.

In other implementations, the target access point may send an RLF report to some other node (e.g., a network node such as an operations and maintenance entity). In response to this message, the other node may send an RLF report message to the serving access point in some cases. Alternatively, the other node may adjust mobility parameters it maintains based on the RLF information (and, optionally, other reported RLF information). In this case, the other node may send information relating to the adjusted mobility parameters to the serving access point.

BRIEF DESCRIPTION OF THE DRAWINGS

These and other sample aspects of the disclosure will be described in the detailed description and the appended claims that follow, and in the accompanying drawings, wherein:

Figure 1:
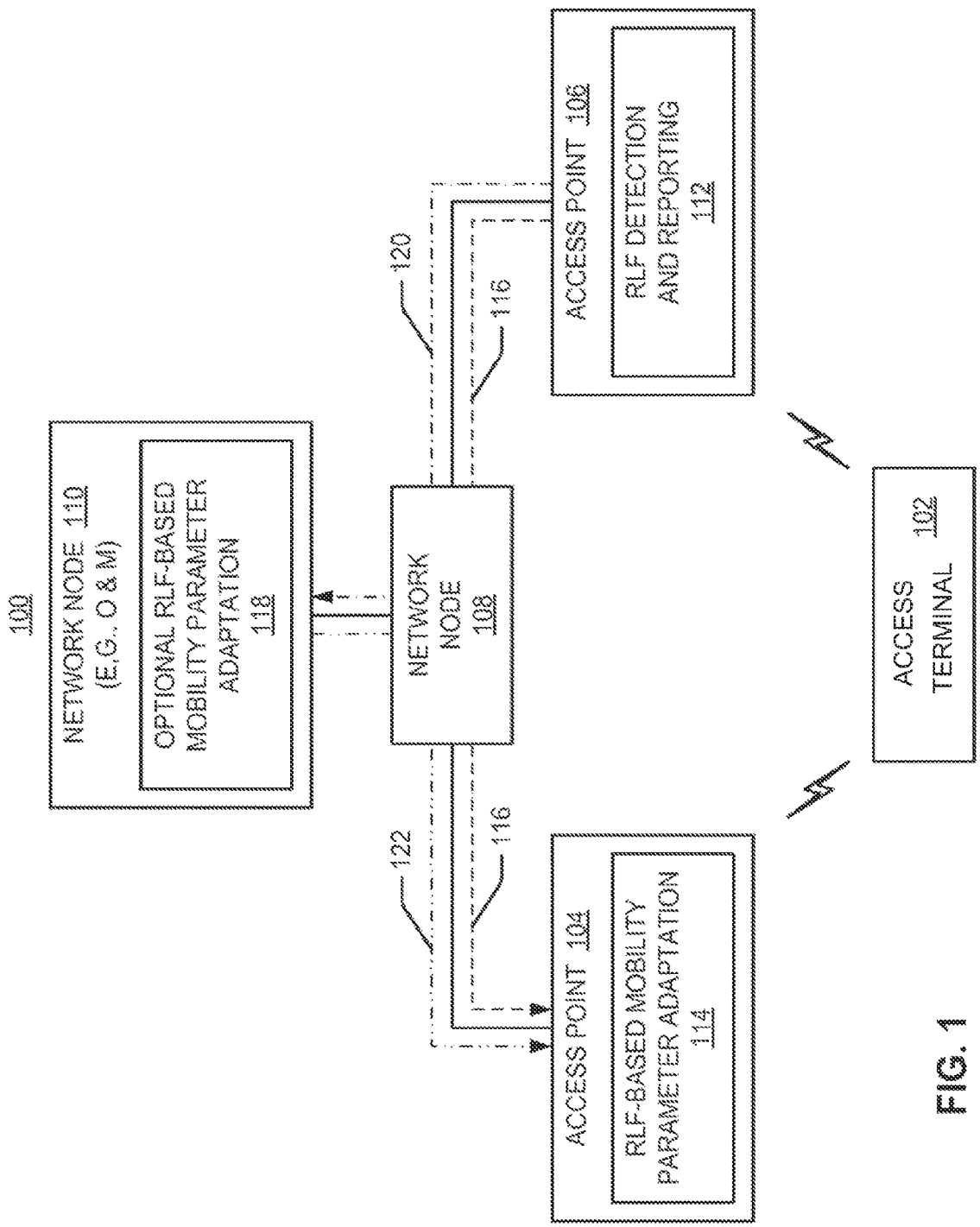
FIG. 1 is a simplified block diagram of several sample aspects of a communication system adapted to support RLF reporting.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network nodes that communicate with one another. It should be appreciated, however, that the teachings herein may be applicable to other types of apparatuses or other similar apparatuses that are referenced using other terminology. For example, in various implementations access points may be referred to or implemented as base stations, eNodeBs, cells, or sectors, while access terminals may be referred to or implemented as user equipment or mobile stations, and so on.

Access points in the system 100 provide one or more services (e.g., network connectivity) for one or more wireless terminals (e.g., access terminal 102) that may be installed within or that may roam throughout a coverage area of the system 100. For example, at various points in time the access terminal 102 may connect to an access point 104, an access point 106, or some other access point (not shown in FIG. 1). Each of the access points 104 and 106 may communicate with one or more network nodes (represented, for convenience, by network nodes 108 and 110) to facilitate wide area network connectivity. These network nodes may take various forms such as, for example, one or more radio and/or core network entities. Thus, in various implementations a network node may represent functionality such as at least one of: network management (e.g., via an operations and maintenance (O&M) entity), call control, session management, mobility management, gateway functions, interworking functions, or some other suitable network functionality.

As will be described in more detail below in conjunction with FIGS. 2-4, access points and, optionally, network nodes in the system 100 may include functionality to facilitate RLF reporting and adapting mobility parameters based on the RLF reporting. To this end, access points in the system 100 may include RLF detection and reporting functionality 112 and, optionally, RLF-based parameter adaptation functionality 114. For example, upon determining that the access terminal 102 arrived at the access point 106 (e.g., a target access point) as a result of an RLF at the access point 104 (e.g., a serving/source access point), the access point 106 may send an RLF report to the access point 104 as represented by the dashed line 116. In this example, the RLF report is sent via one or more network nodes (as represented by network node 108 which may represent the backhaul). Based on this report and, optionally other RLF reports, the access point 104 may adapt one or more mobility parameters.

In some implementations network nodes in the system 100 may include RLF-based parameter adaptation functionality 118. For example, the access point 106 may send an RLF report to the network node 110 as represented by the dashed line 120. In some implementations, the network node 110 may forward the RLF report or RLF information collected by the network node 110 to the access point 104 (e.g., as represented by dashed line 122). In other implementations, however, the network node 110 may adapt one or more mobility parameters and send mobility parameter information to the access point 104 (e.g., as represented by dashed line 122). In these implementations, the access point 102 may simply use the provided mobility parameter information and may, therefore, not incorporate the functionality of block 114.

Figure 2:
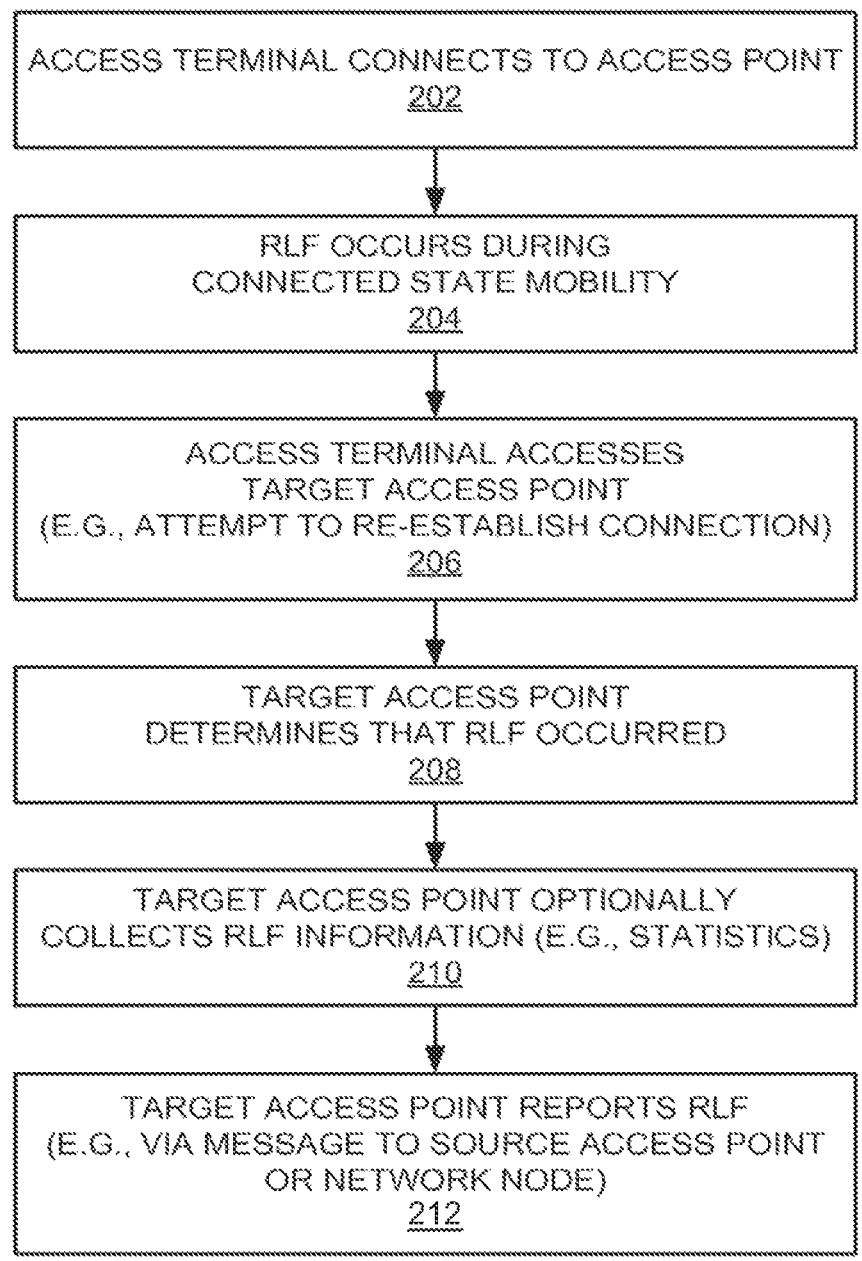
FIG. 2 is a flowchart of several sample aspects of operations that may be performed by a node in conjunction with reporting RLF.

Referring initially to FIG. 2, this flowchart describes several sample operations that may be performed in conjunction with reporting RLF. For convenience, the operations of FIG. 2 (or any other operations discussed or taught herein) may be described as being performed by specific components (e.g., components of the system 100). It should be appreciated, however, that these operations may be performed by other types of components and may be performed using a different number of components. It also should be appreciated that one or more of the operations described herein may not be employed in a given implementation.

As represented by block 202, at some point in time an access terminal will connect to an access point. Thus, in this connected state, the access point may be the serving access point for the access terminal as long as signaling conditions and other conditions (e.g., user selection) permit.

As represented by block 204, at some point in time the radio conditions between the access terminal and the serving access point may deteriorate to the extent that the access terminal experiences RLF during connected state mobility.

This RLF event may or may not have been preceded by handover operations. For example, the network may not have determined that the access terminal should be handed-off to a target access point (e.g., based on measurement reports from the access terminal) before the RLF event. Accordingly, the serving access point may not have even commenced a handover procedure. Alternatively, handover operations may have commenced, but not completed at the time of the RLF event. Thus, in either case, the target access point may not have been prepared for handover when the RLF occurred. For convenience, in the discussion that follows, the target access point may simply be referred to as the "target" and the access point that served the access terminal immediately prior to RLF may be referred to as the "source" (even though a handover procedure may not have been commenced).

As represented by block 206, in response to the RLF, the access terminal may attempt to access a target to re-establish a radio link. For example, the access terminal may attempt to access the neighbor access point that currently has the highest received signal strength from the perspective of the access terminal Here, the access terminal may send a message requesting connection re-establishment (e.g., a radio resource control (RRC) Connection Reestablishment Request) to the target. In conjunction with this attempt at access, the access terminal may provide the target with an identifier of the access terminal and an identifier of the source.

The target may accept or reject the access terminal at this point. For example, if the target has been prepared for handover of the access terminal by the source, the target may accept the access terminal (e.g., the radio link is re-established at the target). In some implementations, the target may simply reject the access terminal if the target has not been prepared for handover. In other implementations, the target may perform a forward handover, whereby the target fetches the appropriate context from the source and completes the handover (e.g., re-establishes the radio link).

As represented by block 208, in conjunction with the attempted access of block 206, the target determines that RLF occurred during connected state mobility of the access terminal (e.g., during handover). The target may make this determination regardless of whether the access terminal was accepted or rejected. For example, if the access terminal was accepted at the target, the access terminal may inform the target of the RLF. If the access terminal was not accepted at the target, the target may infer that there was RLF based on, for example, the access terminal attempting to re-establish a radio link at the target, where the target was not prepared for handover. Also, in some implementations, the access request from the access terminal may indicate that RLF occurred.

As represented by block 210, in some implementations the target collects information (e.g., statistical information) concerning RLFs that were detected by the target and/or handovers at the target. For example, the target may collect information regarding when RLFs occurred, how often RLFs occurred, which access terminals the RLFs were associated with, which sources the RLFs were associated with, the percentage of handovers that resulted in RLF, the percentage of handovers where the target was not prepared, and so on. Accordingly, the access terminal will update the information based on the determination of block 208 and other RLF determinations that are made over time.

As represented by block 212, the target reports the RLF to another node. For example, as discussed in more detail below in conjunction with FIGS. 3 and 4, the target may send a report to the source (i.e., the source is the destination of the report message) or the target may send a report to a network node.

A report based on the determination of RLF at block 208 may include various types of information. For example, the report may indicate that a particular RLF event occurred (e.g., the most recent RLF), the report may comprise a collection of RLF events, the report may comprise statistical RLF information, or the report may include some other type of indication that an RLF occurred. In addition, the report may include an indication of whether the target was prepared for the handover. The report also may include information indicative of the nodes associated with the RLF. For example, the report may include an identifier of the access terminal, an identifier of the target (e.g., a physical cell identifier of the cell where the re-establishment attempt is made), an identifier of the source (e.g., a physical cell identifier of the cell in which the RLF occurred), or any combination of these identifiers.

The target may report RLF in different ways. For example, in some cases a dedicated RLF message may be used. In other cases, the RLF information may be explicitly or implicitly included in another message. For example, in cases where the target performs a context fetch because the target was not prepared for handover, the context fetch message from target to the source may serve as the RLF report (e.g., the context fetch explicitly or implicitly indicates that RLF occurred).

Also, the report may be made via one or more messages. For example, a first set of information relating to the report as taught herein may be provided via one message while a second set of information relating to the report may be provided via another message.

The target may report RLF at various times. For example, a report may be sent in response to a trigger condition (e.g., a defined reporting trigger), at specific times (e.g., based on a reporting schedule), or based on some other condition or conditions. As a specific example, the target may send a report based on a trigger associated with detection of an RLF event (e.g., the report is sent soon after an RLF event is detected). As another example, the target may collect RLF information (e.g., statistics) over time and send the collected information together. This collected information may be sent, for example, at designated times (e.g., according to a periodic reporting schedule), upon collecting a certain amount of information, or at a time that is based on some other condition.

Figure 3:
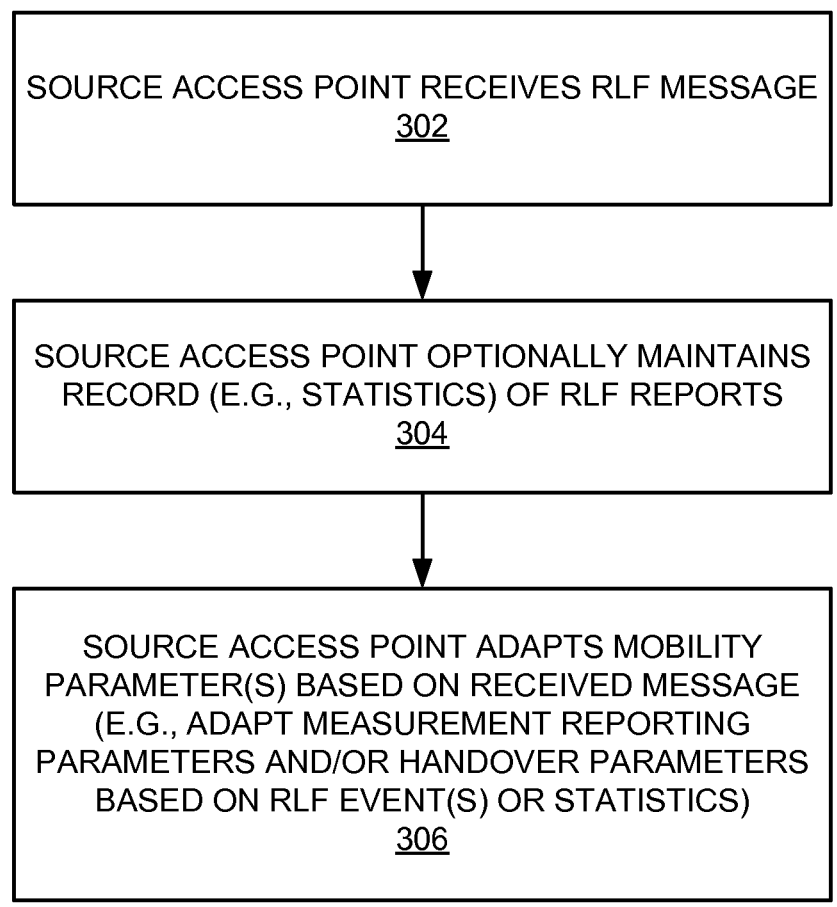
FIG. 3 is a flowchart of several sample aspects of operations that may be performed by a node in conjunction with adapting mobility parameters based on reported RLF.

Referring now to FIG. 3, sample operations that may be performed by a source that receives an RLF report will be discussed. As represented by block 302, the source receives a message from the target or another node (e.g., a network node) that indicates that RLF occurred. As discussed above, the message may indicate that RLF occurred during connected state mobility (e.g., during handover) of an access terminal that was previously served by the source. For example, the message may include information about a specific RLF event, a collection of RLF events, RLF statistics, whether the target was prepared for handover, and so on.

As represented by block 304, the source may maintain a record of received RLF reports (e.g., based on information provided by the message received at block 302 and other similar messages). For example, the source may collect information regarding when RLFs occurred, how often RLFs occurred, which access terminals the RLFs were associated with, which targets the RLFs were associated with, and so on.

As represented by block 306, the source adapts one or more mobility parameters maintained at the source based on the message received at block 302 (e.g., based on information included in the message). For example, the mobility parameter may be adapted based on at least one of: a single RLF event reported by the message at block 302, multiple RLF events as reported by the message at block 302 (and, optionally, other similar messages), statistical information as reported by the message at block 302 (and, optionally, other similar messages), or the record maintained at block 304. By adapting these parameters, the source may improve mobility performance in the network. For example, handover performance may be improved since there may a reduction in the number of too-late handovers, the number of RLFs, and the number of handovers where the target access point is not prepared.

The source may adapt these mobility parameters at various times. For example, mobility parameters may be adapted in response to a trigger condition (e.g., a defined trigger), at specified times (e.g., based on an adaptation schedule), or based on some other condition or conditions. As a specific example, mobility parameters may be adapted based on a trigger associated with receipt of an RLF message (e.g., the mobility parameters are updated soon after the RLF message is received). As another example, the source may update mobility parameters based on RLF information (e.g., statistics) collected over time. Here, the mobility parameters may be updated, for example, at designated times (e.g., according to a periodic adaptation schedule), upon collecting a certain amount of information, or at a time that is based on some other condition.

The mobility parameters may take various forms. For example, a mobility parameter may comprise a measurement reporting parameter or a mobility parameter.

A measurement reporting parameter may specify, for example, how access terminals are to determine whether to conduct a target measurement, how access terminals are to determine whether to report a target measurement, or how access terminals are to determine when to report a target measurement. As a specific example, a measurement reporting parameter may comprise one or more reporting trigger thresholds (e.g., a received signal strength threshold that an access terminal compares to the received signal strength of pilot signals received from potential targets, or a time-to -trigger delay value).

A handover parameter may comprise, for example, a handover performance target (or the current deviation from a performance target) or a parameter that an access point uses to determine whether to perform a handover, uses to determine when to perform a handover, or uses to determine a target access point. As a specific example, a handover parameter may comprise one or more reporting trigger thresholds (e.g., that are compared to the received signal strength of pilot signals an access terminal receives from a serving access point and/or potential targets).

Figure 4:
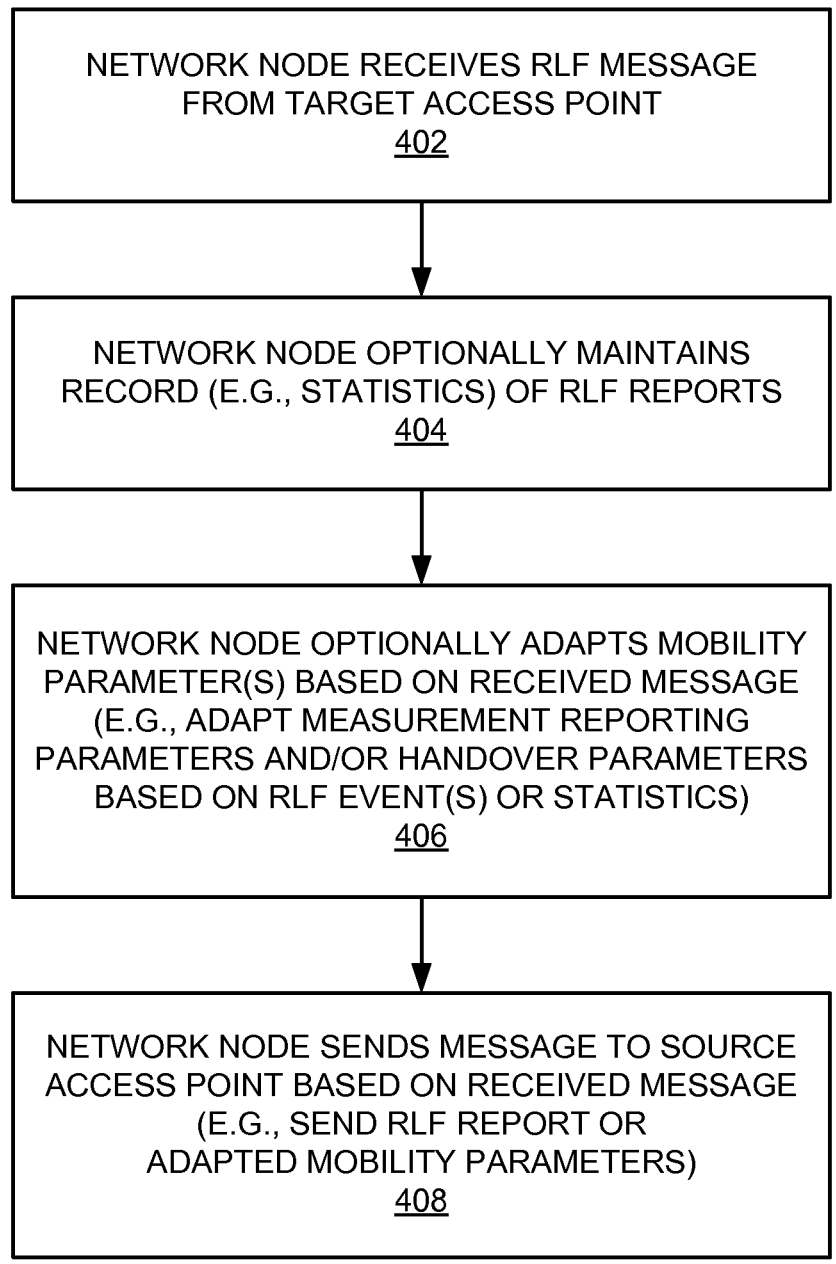
FIG. 4 is a flowchart of several sample aspects of operations that may be performed by a node in conjunction sending a message as a result of a received RLF report.

Referring to FIG. 4, sample operations that may be performed by a network node (e.g., a network management node such as an O&M entity of a cellular network) that receives an RLF report will be discussed. As represented by block 402, the network node receives a message from the target that indicates that RLF occurred. As discussed above, this message may indicate that RLF occurred during connected state mobility (e.g., during handover) of an access terminal that was previously served by the source. Again, the message may include information about a specific RLF event, a collection of RLF events, RLF statistics, whether the target was prepared for handover, and so on.

As represented by block 404, the network node may maintain a record of received RLF reports (e.g., based on information provided by the message received at block 402 and other similar messages). The information collected here may be similar to the information described above at blocks 210 and 304. For example, the network node may collect information regarding when RLFs occurred, how often RLFs occurred, which access terminals the RLFs were associated with, which sources the RLFs were associated with, the percentage of handovers that resulted in RLF, the percentage of handovers where the target was not prepared, and so on.

As represented by block 406, in some implementations the network node adapts one or more mobility parameters to be used by one or more access points based on receipt of the message at block 402. For example, the mobility parameter may be adapted based on at least one of: a single RLF event reported by the message at block 402, multiple RLF events as reported by the message at block 402 (and, optionally, other similar messages), statistical information as reported by the message at block 402 (and, optionally, other similar messages), or the record maintained at block 404.

Similar to the operations of block 306 described above, the source may adapt these mobility parameters at various times. For example, mobility parameters may be adapted in response to a trigger condition, at specified times, or based on some other condition or conditions. Thus, mobility parameters may be adapted based on a trigger associated with receipt of an RLF message or based on RLF information (e.g., statistics) collected over time. Again, the mobility parameters may be updated at designated times, upon collecting a certain amount of information, and so on.

The mobility parameters may take various forms as described above. For example, a mobility parameter may comprise a measurement reporting parameter or a mobility parameter. Also, the network node may control the adaptation of all of the mobility parameters used by one or more access points or may control the adaptation of only some of these mobility parameters. In the latter case, an access point may retain control over some of its mobility parameters.

As represented by block 408, the network node sends a message to the source based on receipt of the message at block 402 (e.g., based on information included in the message). As mentioned above, the network node may send an RLF report to the source or the network node may send updated mobility parameter information to the source.

In the former case, the network node may simply forward the message received at block 402 (or the pertinent contents of that message) to the source. Accordingly, this message may indicate that RLF occurred during handover of the access terminal, RLF information (e.g., specific event, collection, or statistics information) received via the message and/or maintained at block 404, and whether the target was prepared for handover.

In the latter case, the network node may send the mobility parameter or parameters adapted at block 406 (or adjustments to the source's current parameters) to the source. In this case, the source may update its mobility parameters upon receiving this message from the network node.

It should be appreciated that the network node may handle messages relating to one or more source access points. Thus, in some implementations the network node receives different messages directed to different source access points and forwards each of these messages to the appropriate access point. In some implementations, the network node maintains separate records for different access points and independently updates mobility parameters for each of these access points. In some implementations, the network node maintains a record for a set of several access points (e.g., that use common mobility parameters) and updates mobility parameters for that set of access points.

Figure 5:
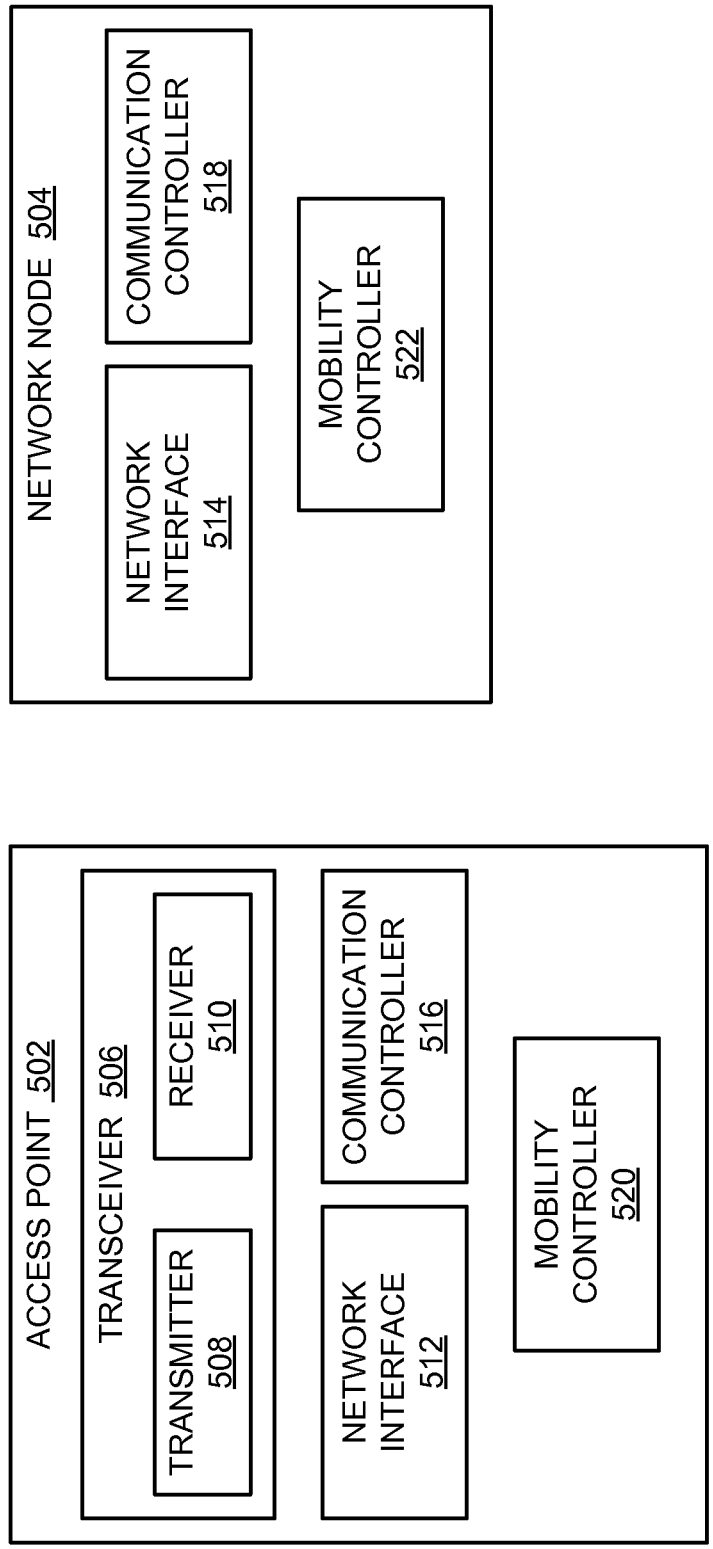
FIG. 5 is a simplified block diagram of several sample aspects of components that may be employed in communication nodes.

FIG. 5 illustrates several sample components that may be incorporated into nodes such as an access point 502 (e.g., corresponding to the access point 104 or the access point 106) and a network node 504 (e.g., corresponding to network node 110 and access point 104) to perform mobility operations as taught herein. The described components also may be incorporated into other nodes in a communication system. For example, other nodes in a system may include components similar to those described for the access point 502 and the network node 504 to provide similar functionality. A given node may contain one or more of the described components. For example, an access point may contain multiple transceiver components that enable the access point to operate on multiple frequencies and/or communicate via different technologies.

As shown in FIG. 5, the access point 502 includes a transceiver 506 for communicating with other nodes. The transceiver 506 includes a transmitter 508 for sending signals (e.g., pilots and messages) and a receiver 510 for receiving signals (e.g., connection requests and other messages).

The access point 502 and the network node 504 also include network interfaces 512 and 514, respectively, for communicating with one another or other network nodes. For example, the network interfaces 512 and 514 may be configured to communicate with one or more network nodes via a wired or wireless backhaul.

The access point 502 and the network node 504 also include other components that may be used in conjunction with mobility operations as taught herein. For example, the access point 502 and the network node 504 may include communication controllers 516 and 518, respectively, for managing communication with other nodes (e.g., sending and receiving RLF messages, mobility parameters, and other messages or indications) and for providing other related functionality as taught herein. In addition, the access point 502 may include a mobility controller 520 (e.g., corresponding in some aspects to the functionality of block 112 and/or blocks 114 of FIG. 1) for managing mobility-related operations (e.g., determining that RLF occurred, collecting statistics, adapting mobility parameters, maintaining RLF records) and for providing other related functionality as taught herein. Similarly, the network node 504 may include a mobility controller 522 (e.g., corresponding in some aspects to the functionality of block 118 of FIG. 1) for managing mobility-related operations (e.g., sending a message based on receipt of an RLF message, maintaining statistics, adapting mobility parameters) and for providing other related functionality as taught herein.

A given component depicted in FIG. 5 may include the functionality of multiple components as described herein. For example, the illustrated components for the access point 502 may provide functionality for reporting RLF (e.g., the functionality described above for access point 106) and/or functionality for adapting mobility parameters (e.g., the functionality described above for access point 104).

Also, the components of FIG. 5 may be implemented in one or more processors (e.g., that uses and/or incorporates data memory). For example, the functionality of blocks 512, 516, and 520 may be implemented by a processor or processors in an access point, while the functionality of blocks 514, 518, and 522 may be implemented by a processor or processors in a network node.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 6:
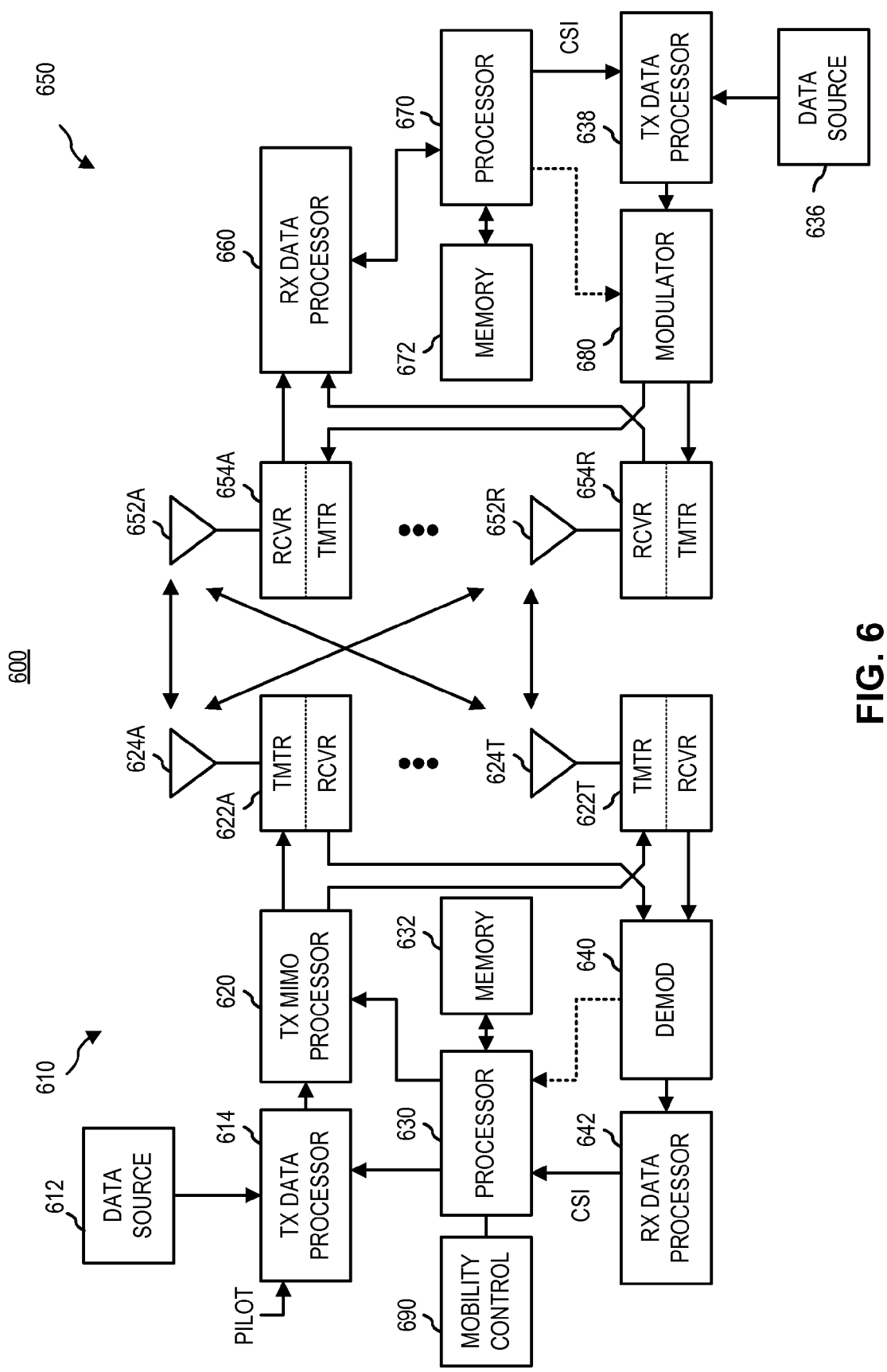
FIG. 6 is a simplified block diagram of several sample aspects of communication components.

FIG. 6 illustrates a wireless device 610 (e.g., an access point) and a wireless device 650 (e.g., an access terminal) of a sample MIMO system 600. At the device 610, traffic data for a number of data streams is provided from a data source 612 to a transmit (TX) data processor 614. Each data stream may then be transmitted over a respective transmit antenna.

The TX data processor 614 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 630. A data memory 632 may store program code, data, and other information used by the processor 630 or other components of the device 610.

The modulation symbols for all data streams are then provided to a TX MIMO processor 620, which may further process the modulation symbols (e.g., for OFDM). The TX MIMO processor 620 then provides $N_T$ modulation symbol streams to $N_T$ transceivers (XCVR) 622A through 622T. In some aspects, the TX MIMO processor 620 applies beam-forming weights to the symbols of the data streams and to the antenna from which the symbol is being transmitted.

Each transceiver 622 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 622A through 622T are then transmitted from $N_T$ antennas 624A through 624T, respectively.

At the device 650, the transmitted modulated signals are received by $N_R$ antennas 652A through 652R and the received signal from each antenna 652 is provided to a respective transceiver (XCVR) 654A through 654R. Each transceiver 654 conditions (e.g., filters, amplifies, and down-converts) a respective received signal, digitizes the conditioned signal to provide samples, and further processes the samples to provide a corresponding "received" symbol stream.

A receive (RX) data processor 660 then receives and processes the $N_R$ received symbol streams from $N_R$ transceivers 654 based on a particular receiver processing technique to provide $N_T$ "detected" symbol streams. The RX data processor 660 then demodulates, deinterleaves, and decodes each detected symbol stream to recover the traffic data for the data stream. The processing by the RX data processor 660 is complementary to that performed by the TX MIMO processor 620 and the TX data processor 614 at the device 610.

A processor 670 periodically determines which pre-coding matrix to use (discussed below). The processor 670 formulates a reverse link message comprising a matrix index portion and a rank value portion. A data memory 672 may store program code, data, and other information used by the processor 670 or other components of the device 650.

The reverse link message may comprise various types of information regarding the communication link and/or the received data stream. The reverse link message is then processed by a TX data processor 638, which also receives traffic data for a number of data streams from a data source 636, modulated by a modulator 680, conditioned by the transceivers 654A through 654R, and transmitted back to the device 610.

At the device 610, the modulated signals from the device 650 are received by the antennas 624, conditioned by the transceivers 622, demodulated by a demodulator (DEMOD) 640, and processed by a RX data processor 642 to extract the reverse link message transmitted by the device 650. The processor 630 then determines which pre-coding matrix to use for determining the beam-forming weights then processes the extracted message.

FIG. 6 also illustrates that the communication components may include one or more components that perform mobility operations as taught herein. For example, a mobility control component 690 may cooperate with the processor 630 and/or other components of the device 610 to send/receive signals to/from another device (e.g., device 650) as taught herein. It should be appreciated that for each device 610 and 650 the functionality of two or more of the described components may be provided by a single component. For example, a single processing component may provide the functionality of the mobility control component 690 and the processor 630. In some implementations, the processor 630 and the memory 632 may collectively provide mobility-related and other functionality as taught herein for the device 610.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1 xRTT, 1xEV-DO Re10, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 7:
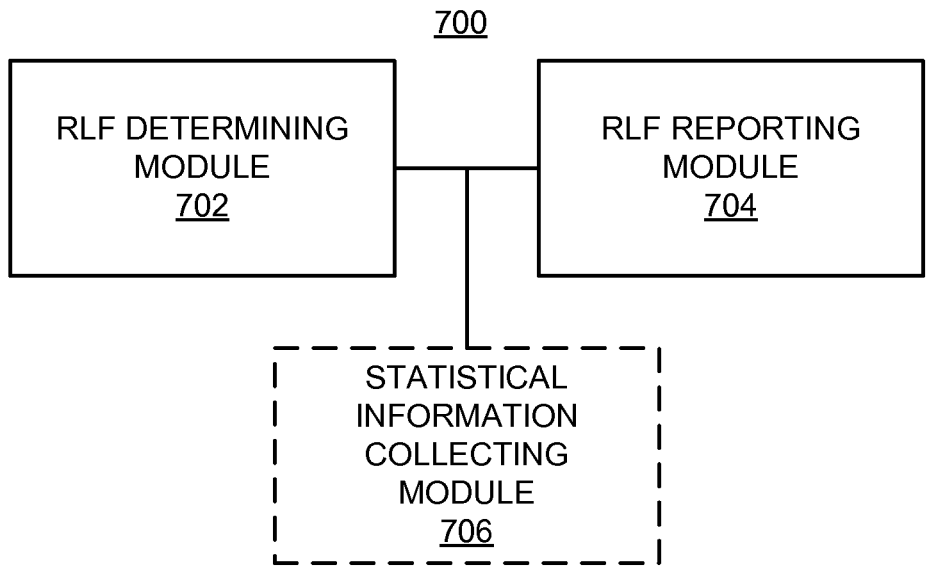
FIGS. 7-9 are simplified block diagrams of several sample aspects of apparatuses configured to facilitate improved mobility as taught herein.
Figure 8:
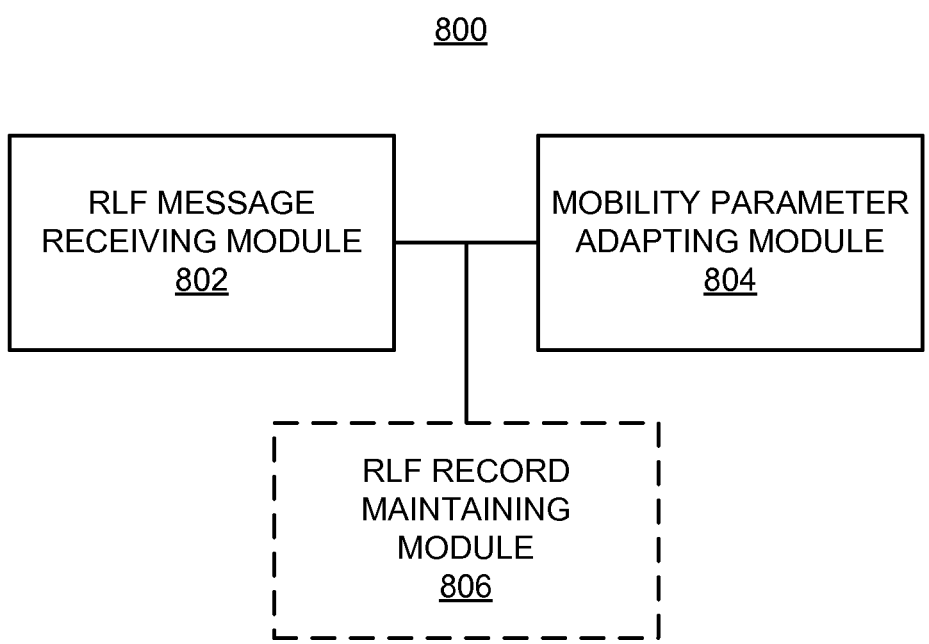
Figure 9:
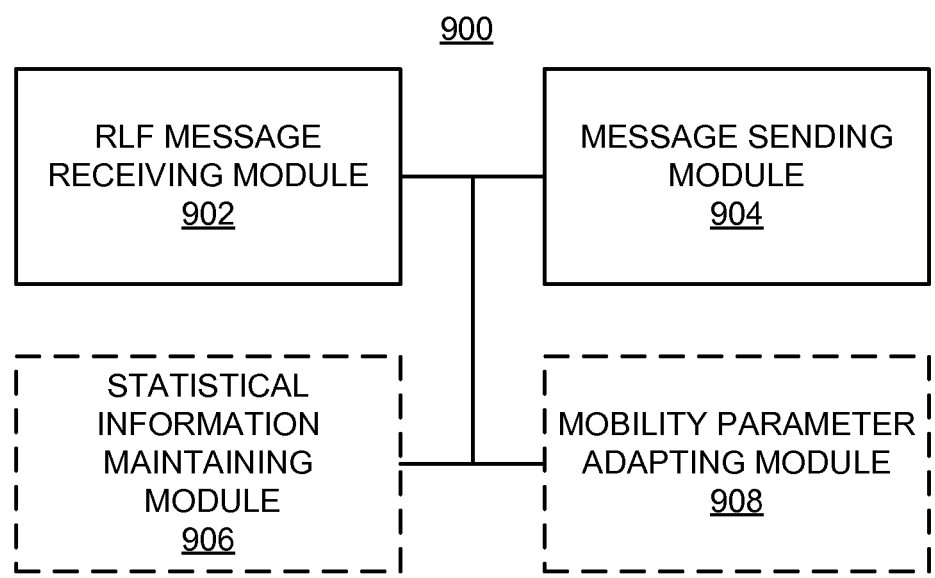

The functionality described herein (e.g., with regard to one or more of the accompanying figures) may correspond in some aspects to similarly designated "means for" functionality in the appended claims. Referring to FIGS. 7-9, apparatuses 700, 800, and 900 are represented as a series of interrelated functional modules. Here, an RLF determining module 702 and a statistical information collecting module 706 may correspond at least in some aspects to, for example, a mobility controller (e.g., controller 520) as discussed herein. An RLF reporting module 704 may correspond at least in some aspects to, for example, a communication controller (e.g., controller 516) as discussed herein. An RLF message receiving module 802 may correspond at least in some aspects to, for example, a communication controller (e.g., controller 516) as discussed herein. A mobility parameter adapting module 804 and an RLF record maintaining module 806 may correspond at least in some aspects to, for example, a mobility controller (e.g., controller 520) as discussed herein. An RLF message receiving module 902 may correspond at least in some aspects to, for example, a communication controller (e.g., controller 518) as discussed herein. A message sending module 904, a statistical information maintaining module 906, and a mobility parameter adapting module 908 may correspond at least in some aspects to, for example, a mobility controller (e.g., controller 522) as discussed herein.

The functionality of the modules of FIGS. 7-9 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 7-9 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
receiving, at a first access point, an access request from an access terminal, wherein the access request includes an identifier of the access terminal and an identifier of a second access point, wherein the second access point is a source access point of a handover for the access terminal;
receiving, at the first access point, an indication from the access terminal that a radio link failure occurred during the handover of the access terminal from the second access point; and
sending a dedicated radio link failure message from the first access point to the second access point, wherein the dedicated radio link failure message comprises the indication that the radio link failure occurred during the handover from the second access point, and wherein the dedicated radio link failure message is used to adapt one or more mobility parameters relating to handover performance at the second access point.

2. The method of claim 1, wherein the first access point was prepared for handover of the access terminal.

3. The method of claim 1, wherein:
the first access point comprises a target access point for the handover.

4. The method of claim 1, wherein the access request comprises a connection re-establishment request.

5. The method of claim 1, wherein the dedicated radio link failure message further comprises at least one of the group consisting of: an identifier of the first access point, an identifier of the second access point, and the identifier of the access terminal.

6. The method of claim 1, wherein:
the first access point accepts the handover of the access terminal.

7. The method of claim 1, wherein the first access point rejects the handover of the access terminal.

8. The method of claim 1, wherein the dedicated radio link failure message comprises an indication of whether the first access point was prepared for handover of the access terminal.

9. The method of claim 1, further comprising collecting statistical information relating to handovers at the first access point, wherein the dedicated radio link failure message comprises the statistical information.

10. The method of claim 1, wherein the dedicated radio link failure message is sent at a time specified by a periodic reporting schedule.

11. The method of claim 1, wherein the dedicated radio link failure message is sent at a time specified by a reporting trigger.

12. The method of claim 1, wherein:
the first access point was not prepared for handover of the access terminal.

13. An apparatus for communication, comprising:
a receiver configured to receive, at a first access point, an access request from an access terminal, wherein the access request includes an identifier of the access terminal and an identifier of a second access point, wherein the second access point is a source access point of a handover for the access terminal;
a mobility controller configured to receive, at the first access point, an indication from the access terminal that a radio link failure occurred during the handover of the access terminal from the second access point; and
a communication controller configured to send a dedicated radio link failure message from the first access point to the second access point, wherein the dedicated radio link failure message comprises the indication that the radio link failure occurred during the handover from the second access point, and wherein the dedicated radio link failure message is used to adapt one or more mobility parameters relating to handover performance at the second access point.

14. The apparatus of claim 13, wherein the first access point was prepared for handover of the access terminal.

15. The apparatus of claim 13, wherein:
the first access point comprises a target access point for the handover.

16. The apparatus of claim 13, wherein the access request comprises a connection re-establishment request.

17. The apparatus of claim 13, wherein the dedicated radio link failure message further comprises at least one of the group consisting of: an identifier of the first access point, an identifier of the second access point, and the identifier of the access terminal.

18. The apparatus of claim 13, wherein:
the first access point accepts the handover of the access terminal.

19. The apparatus of claim 13, wherein the first access point rejects the handover of the access terminal.

20. The apparatus of claim 13, wherein the dedicated radio link failure message comprises an indication of whether the first access point was prepared for handover of the access terminal.

21. The apparatus of claim 13, wherein the mobility controller is further configured to collect statistical information relating to handovers at the first access point, wherein the dedicated radio link failure message comprises the statistical information.

22. The apparatus of claim 13, wherein the dedicated radio link failure message is sent at a time specified by a periodic reporting schedule.

23. The apparatus of claim 13, wherein the dedicated radio link failure message is sent at a time specified by a defined reporting trigger.

24. The apparatus of claim 13, wherein:
the first access point was not prepared for handover of the access terminal.

25. An apparatus for communication, comprising:
means for receiving, at a first access point, an access request from an access terminal, wherein the access request includes identifier of the access terminal and an identifier of a second access point, wherein the second access point is a source access point of a handover for the access terminal;
means for receiving, at the first access point, an indication from the access terminal that a radio link failure occurred during the handover of the access terminal from the second access point; and
means for sending a dedicated radio link failure message from the first access point to the second access point, wherein the dedicated radio link failure message comprises the indication that the radio link failure occurred during the handover from the second access point, and wherein the dedicated radio link failure message is used to adapt one or more mobility parameters relating to handover performance at the second access point.

26. The apparatus of claim 25, wherein the first access point was prepared for handover of the access terminal.

27. The apparatus of claim 25, wherein:
the first access point comprises a target access point for the handover.

28. The apparatus of claim 25, wherein the access request comprises a connection re-establishment request.

29. The apparatus of claim 25, wherein the dedicated radio link failure message further comprises at least one of the group consisting of: an identifier of the first access point, an identifier of the second access point, and the identifier of the access terminal.

30. The apparatus of claim 25, wherein:
the first access point accepts the handover of the access terminal.

31. The apparatus of claim 25, wherein the first access point rejects the handover of the access terminal.

32. The apparatus of claim 25, wherein the dedicated radio link failure message comprises an indication of whether the first access point was prepared for handover of the access terminal.

33. The apparatus of claim 25, further comprising means for collecting statistical information relating to handovers at the first access point, wherein the dedicated radio link failure message comprises the statistical information.

34. The apparatus of claim 25, wherein the dedicated radio link failure message is sent at a time specified by a periodic reporting schedule.

35. The apparatus of claim 25, wherein the dedicated radio link failure message is sent at a time specified by a defined reporting trigger.

36. The apparatus of claim 25, wherein:
the first access point was not prepared for handover of the access terminal.

37. A computer-program product, comprising:
a non-transitory computer-readable medium comprising code for causing a computer to:
receive, at a first access point, an access request from an access terminal, wherein the access request includes an identifier of the access terminal and an identifier of a second access point, wherein the second access point is a source access point of a handover for the access terminal;
receive, at the first access point, an indication from the access terminal that a radio link failure occurred during the handover of the access terminal from the second access point; and
send a dedicated radio link failure message from the first access point to the second access point, wherein the dedicated radio link failure message comprises the indication that the radio link failure occurred during the handover from the second access point, and wherein the dedicated radio link failure message is used to adapt one or more mobility parameters relating to handover performance at the second access point.

38. The computer-program product of claim 37, wherein the first access point was prepared for handover of the access terminal.

39. The computer-program product of claim 37, wherein:
the first access point comprises a target access point for the handover.

40. The computer-program product of claim 37, wherein the access request comprises a connection re-establishment request.

41. The computer-program product of claim 37, wherein:
the first access point accepts the handover of the access terminal.

42. The computer-program product of claim 37, wherein the dedicated radio link failure message comprises an indication of whether the first access point was prepared for handover of the access terminal.

43. The computer-program product of claim 37, wherein:
the computer-readable medium further comprises code for causing the computer to collect statistical information relating to handovers at the first access point; and the dedicated radio link failure message comprises the statistical information.

44. The computer-program product of claim 37, wherein the dedicated radio link failure message is sent at a time specified by a periodic reporting schedule.

45. The computer-program product of claim 37, wherein the dedicated radio link failure message is sent at a time specified by a defined reporting trigger.

* * * * *